UNITED STATES PATENT OFFICE.

ARTHUR RICHARD COULSON, OF SAN QUENTIN, CALIFORNIA.

MILK-TREATED WHEAT OR OTHER CEREAL FLOUR.

1,287,600.　　　　Specification of Letters Patent.　　Patented Dec. 10, 1918.

No Drawing.　　Application filed August 7, 1917.　Serial No. 184,930.

*To all whom it may concern:*

Be it known that I, ARTHUR RICHARD COULSON, a citizen of the United States, residing at San Quentin, in the county of Marin and State of California, have invented a new and useful Composition of Milk-Treated Wheat or other Cereal Flour to be Used for Human Food, of which the following is a specification.

The object of my invention is the production of a baking flour that will contain a higher percentage of food nutrients, especially of the bone and muscle producing elements and also to better its baking qualities. Also, I aim to put these solids in such form as to aid in the yeast fermentation of the dough when making bread.

My composition consists of a mixture of wheat or other cereal flour to be used for human food and the solids obtained from cows' milk curdled, and milk by-products; viz: the casein, albumin, milk, sugar, and mineral elements of milk. I combine the solids of curdled milk or clabber, and the solids of buttermilk with the cereal flour in such a manner that, while attaining the increase of the important nutrient elements usually lacking in ordinary cereal flour, the tendency of the resultant material to produce doughy bread when baked is greatly minimized and its baking qualities improved.

In preparing the composition, I have proceeded as follows: I put twenty-five (25) quarts of sweet skimmed milk in a porcelain tank or large earthen-ware crock, and heat it until luke-warm; to this is added one-half (½) of a rennet tablet, such as is commercially supplied for cheese-making, (about one-half (½) an ounce.) As soon as the milk becomes a thick curd it is poured over a fine mesh screen to drain the whey from the solids. To the solids thus obtained is added from two to four ounces of bicarbonate of soda and from four to eight ounces of granulated or powdered sugar. If the product is to be used in a pancake flour or meal then a little salt is also added. Stir all together, then dry by mild artificial heat until hard and the moisture content has been reduced to about twelve per cent. (12%), more or less. In order to limit bacterial development, the product should be prepared as quickly as possible and kept clean and free from taint or odor.

In preparing the buttermilk, I prefer to locate the container in a moderately warm place, permitting the milk to stand for a few days until the solids partly settle, then I dip off as much of the whey as possible. The remainder or thick part of the buttermilk is slowly evaporated by a mild heat so as not to kill the lactic acid bacilli which when mixed with flour has a tendency to make the dough rise quicker and also give special properties that are of food value.

The products obtained from about twenty-five (25) quarts of skim milk and about fifteen (15) quarts of buttermilk, after being thoroughly dried, are ground and re-ground into a flour or powder and then sifted in with one hundred (100) pounds more or less of the flour to be treated, and the whole thoroughly mixed.

Other methods such as condensing or evaporating sour milk products until the moisture content has been reduced to the necessary extent may also be used to obtain the solids, special care being taken to prevent the product from getting burned or having a rancid taste or odor.

In making milk-treated whole wheat or other whole cereal flour, I use recleaned grain suitable for milling purposes and immerse it for six to eight hours in lukewarm sweet milk, sweet skim milk, or buttermilk or a mixture of skim milk and buttermilk, using from thirty to forty quarts of the milk for each one hundred pounds of grain. After the grain is thoroughly saturated, I dry the grain at a temperature of not to exceed one hundred and eighty (180) degrees Fahrenheit until the moisture has been reduced to about twelve or fourteen per cent. Then I grind it into flour and it is ready for use.

When flour to be used for human food is deficient in gluten and when it is desired to increase the percentage of protein and also the mineral elements, and to better its baking as well as food qualities, this may be accomplished by my composition and method.

What is claimed is:

A baking flour comprising the combination of a cereal flour, three to five per cent. of solids of curdled skim-milk, and two to five per cent. solids of buttermilk, said solids to be the residue that is left after the curdled milk or buttermilk is dried.

ARTHUR RICHARD COULSON.